United States Patent
Brunninger

(10) Patent No.: US 10,363,947 B2
(45) Date of Patent: Jul. 30, 2019

(54) STORAGE WAGON FOR BULK MATERIAL

(71) Applicant: Plasser & Theurer Export von Bahnbaumaschinen Gesellschaft m.b.H., Vienna (AT)

(72) Inventor: Manfred Brunninger, Altenberg (AT)

(73) Assignee: Plasser & Theurer Export von Bahnbaumaschinen Gesellschaft m.b.H., Vienna (AT)

( * ) Notice: Subject to any disclaimer, the term of this patent is extended or adjusted under 35 U.S.C. 154(b) by 0 days.

(21) Appl. No.: 15/551,089

(22) PCT Filed: Mar. 15, 2016

(86) PCT No.: PCT/EP2016/000456
§ 371 (c)(1),
(2) Date: Aug. 15, 2017

(87) PCT Pub. No.: WO2016/165805
PCT Pub. Date: Oct. 20, 2016

(65) Prior Publication Data
US 2018/0029615 A1   Feb. 1, 2018

(30) Foreign Application Priority Data
Apr. 13, 2015   (AT) .................. A 215/2015

(51) Int. Cl.
*B61D 3/00* (2006.01)
*E01B 27/00* (2006.01)
(Continued)

(52) U.S. Cl.
CPC ............. *B61D 3/00* (2013.01); *B61D 15/00* (2013.01); *B65G 15/00* (2013.01); *B65G 67/08* (2013.01);
(Continued)

(58) Field of Classification Search
CPC .... E01B 27/00; E01B 27/10; E01B 2203/032; E01B 2203/036; B65G 2812/02128; B65G 2814/0326; B65G 2814/0352
See application file for complete search history.

(56) References Cited

U.S. PATENT DOCUMENTS

| | | | | |
|---|---|---|---|---|
| 4,760,796 A * | 8/1988 | Theurer | .................. | E01B 27/10 104/7.3 |
| 5,341,746 A * | 8/1994 | Theurer | .................. | E01B 27/00 104/2 |
| 5,400,718 A * | 3/1995 | Theurer | .................. | B61D 7/06 104/2 |

FOREIGN PATENT DOCUMENTS

| | | |
|---|---|---|
| EP | 1 184 248 A2 | 3/2002 |
| EP | 2 155 966 A1 | 2/2010 |
| WO | 2008/138432 A1 | 11/2008 |

OTHER PUBLICATIONS

International Search Report of PCT/EP2016/000456, dated Jun. 29, 2016.

* cited by examiner

*Primary Examiner* — Mark C Hageman
(74) *Attorney, Agent, or Firm* — Collard & Roe, P.C.

(57) ABSTRACT

A storage wagon (1) for bulk material (2) has, above the transfer end (9) of a bottom conveyor belt (4) and underneath a discharge end (15) of an auxiliary conveyor belt (14), a deflector plate (17) extending perpendicularly to the longitudinal direction (3) of the wagon. The deflector plate (17) is designed to be pivotable about a pivot axis (18) relative to the loading container (5) for changing a deflection angle α enclosed with a conveying plane (19) of the bottom conveyor belt (4).

9 Claims, 1 Drawing Sheet

(51) Int. Cl.
  *B61D 15/00* (2006.01)
  *B65G 15/00* (2006.01)
  *B65G 67/08* (2006.01)
  *B65G 67/24* (2006.01)
(52) U.S. Cl.
  CPC .............. *B65G 67/24* (2013.01); *E01B 27/00* (2013.01); *B65G 2812/02128* (2013.01); *B65G 2814/0326* (2013.01); *B65G 2814/0352* (2013.01)

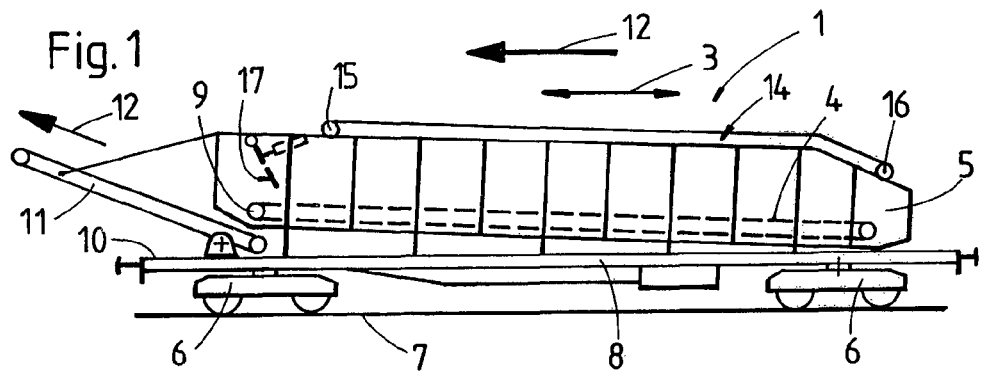
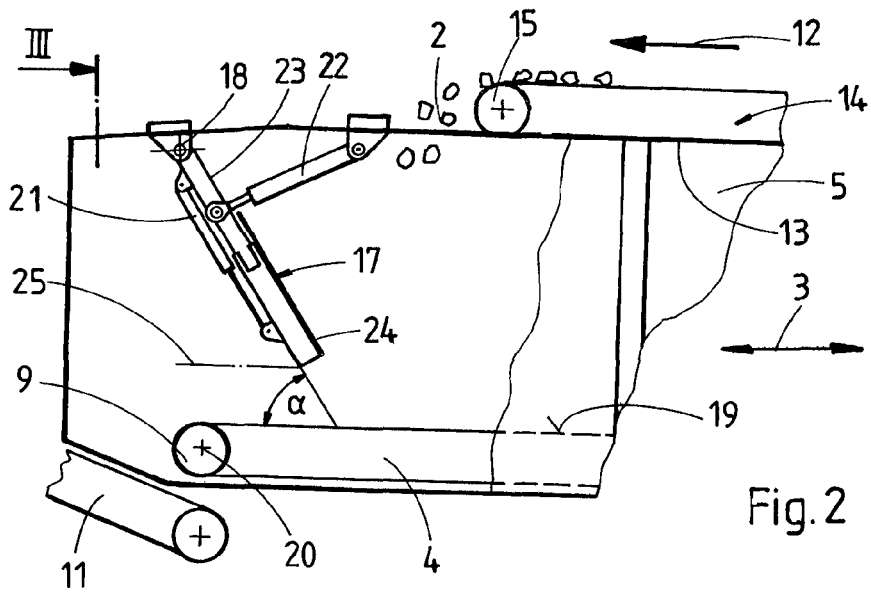
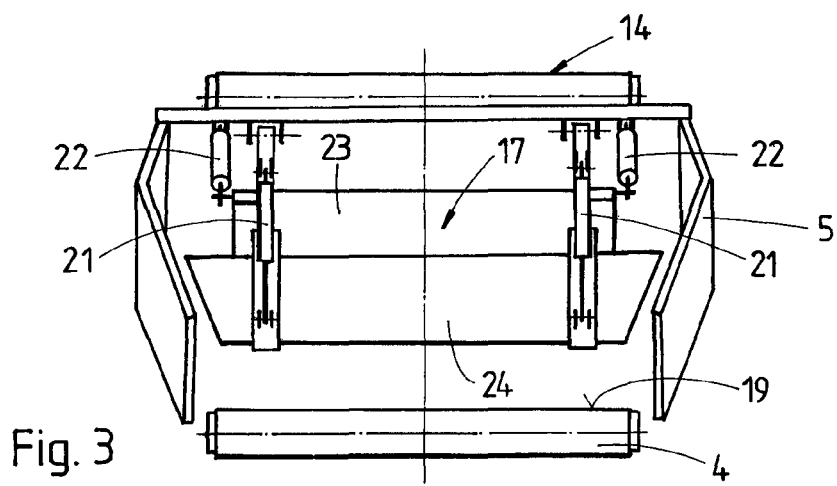

STORAGE WAGON FOR BULK MATERIAL

CROSS REFERENCE TO RELATED APPLICATIONS

This application is the National Stage of PCT/EP2016/000456 filed on Mar. 15, 2016, which claims priority under 35 U.S.C. § 119 of Austrian Application No. A 215/2015 filed on Apr. 13, 2015, the disclosures of which are incorporated by reference. The international application under PCT article 21(2) was not published in English.

The invention relates to a storage wagon for bulk material, including a loading container which is mobile on on-track undercarriages and has a bottom conveyor belt extending the longitudinal direction of the wagon, and a transfer conveyor belt for passing on stored bulk material in a conveying direction, the transfer conveyor belt adjoining a transfer end of the bottom conveyor belt and projecting beyond a front end of the wagon, and also including an auxiliary conveyor belt arranged at an upper end of the loading container and extending in the longitudinal direction of the wagon.

A storage wagon of this type is already known, for example, from EP 2 155 966. The auxiliary conveyor belt which is displaceable in the longitudinal direction of the wagon can be used for transporting into the loading container, for instance, bulk material discharged by an excavator shovel.

It is the object of the present invention to provide a storage wagon of the type mentioned at the beginning with which an intermediate storage of bulk material is possible.

According to the invention, this object is achieved with a storage wagon of the specified type by way of the features cited in the characterizing part of the main claim.

With this configuration, it is now possible to discharge bulk material, as required, from the auxiliary conveyor belt via the deflector plate onto the bottom conveyor belt, while the latter is moved at a slow storage speed opposite to the conveying direction. This temporary intermediate storage makes it now possible to uncouple the immediately adjoining storage wagon for the emptying thereof, without having to halt the continuous accrual of bulk material to be stored in the course of a continuous working process, for example a ballast cleaning.

Additionally, in the case of an alternative through-transport of the bulk material from the bottom conveyor belt to the adjoining transfer conveyor belt, the deflector plate can also be used to precisely limit the height of the bulk material by forming a gap between the deflector plate and the bottom conveyor belt. Thus, any difference in height caused by irregular dumping of material can be evened out, as a result of which the storage process for the succeeding storage wagons can be improved.

Additional advantages of the invention become apparent from the dependent claims and the drawing description.

The invention will be described in more detail below with reference to an embodiment represented in the drawing in which FIG. 1 shows a side view of a storage wagon, FIG. 2 shows an enlarged side view of a wagon end having a deflector plate, and FIG. 3 shows a cross-section of the storage wagon according to section line III in FIG. 2.

For storage of bulk material 2, a storage wagon 1 visible in FIG. 1 is equipped with a bottom conveyor belt 4, extending in the longitudinal direction 3 of the wagon, which is arranged in place of a bottom surface in a loading container 5. The loading container 5 is fastened to a wagon frame 8 mobile on a track 7 by means of on-track undercarriages 6.

A transfer conveyor belt 11—projecting beyond a front end 10 of the wagon—is provided adjoining a transfer end 9 of the bottom conveyor belt 4. By means of the transfer conveyor belt 11, the bulk material 2 can be transported, as desired, in a conveying direction 12 into a preceding further storage wagon 1 (not shown).

As can be seen particularly in FIGS. 2 and 3, an auxiliary conveyor belt 14 extending in the longitudinal direction 3 of the wagon is arranged at an upper end 13 of the loading container 5. Said auxiliary conveyor belt 14 has a discharge end 15 at the front—with regard to the conveying direction 12—and a receiving end 16 at the rear.

Arranged above the transfer end 9 of the bottom conveyor belt 4 and underneath the discharge end 15 of the auxiliary conveyor belt 14 is a deflector plate 17 extending perpendicularly to the longitudinal direction 3 of the wagon. Said deflector plate 17 is designed to be pivotable about a pivot axis 18 relative to the loading container 5 for changing a deflection angle α enclosed with a conveying plane 19 of the bottom conveyor belt 4.

The pivot axis 18 positioned in the region of the upper end 13 of the loading container 5 is arranged parallel to a deflection axis 20 of the bottom conveyor belt 4. The deflector plate 17 is composed of an upper plate section 23—with regard to a vertical—and a lower plate section 24 which is vertically adjustable relative to the former by means of a drive 21. The pivoting of the deflector plate 17 about the pivot axis 18 is carried out by pivot drives 22.

The potential applications of the storage wagon 1 designed according to the invention will be described in more detail below. Loading of the storage wagon 1 takes place, for example, by a cleaning machine, not further shown, by means of which the bulk material 2, for instance as spoil, is discharged upon the receiving end 16 at the rear of the auxiliary conveyor belt 14.

In the region of the discharge end 15 at the front, the bulk material 2 is discharged upon the front end of the bottom conveyor belt 4 which carries out a further transport onto the transfer conveyor belt 11. During this, it is possible to set the height of the bulk material layer, as desired, by corresponding adjustment of the deflector plate 17 (see line 25 in FIG. 2). This—despite varying amounts of accruing spoil—results in an advantageously uniform transfer of bulk material 2 onto preceding storage wagons 1, not shown in detail, which are coupled together in known manner into a train formation.

As soon as the preceding storage wagons 1 have been filled, they are uncoupled from the illustrated storage wagon 1 and transported away for emptying. In order to avoid a stoppage of the working process (for example, ballast cleaning) in this case, the operation of the storage wagon 1 can be switched over to storage function in an advantageous manner. This is carried out in that the bulk material 2 deflected by the deflector plate 17, by reversal of the conveying direction 12 of the bottom conveyor belt 4 (opposite to the first conveying direction represented by the arrow 12), is conveyed in the direction towards the receiving end at the rear and stored for complete filling of the loading container 5. As soon as the emptied storage wagons 1 have been coupled up again, a conversion to conveying operation takes place as has been described before.

The invention claimed is:

1. A storage wagon for bulk material comprising:
a loading container having a loading end and a transfer end the loading container is mobile on on-track undercarriages
a bottom conveyor belt extending the longitudinal direction of the wagon the bottom conveyor belt having a loading end and a transfer end,
a transfer conveyor belt for passing on the stored bulk material in a conveying direction,
the transfer conveyor belt adjoining transfer end of the bottom conveyor belt and projecting beyond a front end of the wagon, and
an auxiliary conveyor belt arranged at an upper end of the loading container and extending in the longitudinal direction of the wagon,
a deflector plate arranged above the transfer end of the bottom conveyor belt and underneath a discharge end of the auxiliary conveyor belt extending perpendicularly to the longitudinal direction of the wagon,
a pivot axis disposed above the transfer end of the bottom conveyor belt;
the deflector plate is designed to be pivotable about the pivot axis relative to the loading container the deflector plate extending back towards the loading end of the bottom conveyor belt, the deflector plate for changing a deflection angle a enclosed with a conveying plane of the bottom conveyor belt wherein the bottom conveyor belt is configured for a reversal of its conveying direction.

2. The storage wagon according to claim 1, wherein the pivot axis is arranged parallel to a deflection axis of the bottom conveyor belt.

3. The storage wagon according to claim 2, wherein the pivot axis is arranged in the region of the upper end of the loading container.

4. The storage wagon according to claim 1, wherein the deflector plate is located at a front end of the storage wagon.

5. The storage wagon as in claim 4, wherein the auxiliary conveyor belt has a discharge end disposed at a front end of the bottom conveyor belt above the deflector plate.

6. The storage wagon as in claim 1, wherein the deflector plate is angled offset from a vertical orientation to deflect the bulk material towards a back end of the storage wagon.

7. A storage wagon for bulk material comprising:
a loading container which is mobile on on-track undercarriages;
a bottom conveyor belt extending the longitudinal direction of the wagon,
a transfer conveyor belt for passing on the stored bulk material in a conveying direction, the transfer conveyor belt adjoining a transfer end of the bottom conveyor belt and projecting beyond a front end of the wagon, and
an auxiliary conveyor belt arranged at an upper end of the loading container and extending in the longitudinal direction of the wagon,
a deflector plate arranged above the transfer end of the bottom conveyor belt and underneath the deflector plate is designed to be pivotable about a pivot axis relative to the loading container for changing a deflection angle a enclosed with a conveying plane of the bottom conveyor belt;
wherein the bottom conveyor belt is configured for a reversal of its conveying direction;
wherein deflector plate is composed of an upper plate section—with regard to a vertical—and a lower plate section which is vertically adjustable relative to the former by means of a drive.

8. The storage wagon according to claim 7, wherein the pivot axis is arranged parallel to a deflection axis of the bottom conveyor belt.

9. The storage wagon according to claim 8, wherein the pivot axis is arranged in the region of the upper end of the loading container.

* * * * *